United States Patent
Chieregato et al.

(10) Patent No.: US 11,492,560 B2
(45) Date of Patent: Nov. 8, 2022

(54) DEEP DESULPHURIZATION OF LOW SULPHUR CONTENT FEEDSTOCK

(71) Applicant: TOTAL MARKETING SERVICES, Puteaux (FR)

(72) Inventors: Alessandro Chieregato, Doha (QA); Jean-Pierre Dath, Beloeil Hainault (BE); Stéphane Kressmann, Communay (FR)

(73) Assignee: TOTAL MARKETING SERVICES, Puteaux (FR)

( * ) Notice: Subject to any disclaimer, the term of this patent is extended or adjusted under 35 U.S.C. 154(b) by 0 days.

(21) Appl. No.: 17/286,112

(22) PCT Filed: Oct. 22, 2019

(86) PCT No.: PCT/EP2019/078775
§ 371 (c)(1),
(2) Date: Apr. 16, 2021

(87) PCT Pub. No.: WO2020/083945
PCT Pub. Date: Apr. 30, 2020

(65) Prior Publication Data
US 2021/0380889 A1    Dec. 9, 2021

(30) Foreign Application Priority Data

Oct. 22, 2018 (EP) .................... 18306380

(51) Int. Cl.
*C10G 45/08* (2006.01)
*B01J 21/04* (2006.01)
(Continued)

(52) U.S. Cl.
CPC .............. *C10G 45/08* (2013.01); *B01J 21/04* (2013.01); *B01J 23/002* (2013.01); *B01J 23/882* (2013.01);
(Continued)

(58) Field of Classification Search
CPC .................. C10G 45/08; C10G 65/12; C10G 2300/1059; C10G 2300/202;
(Continued)

(56) References Cited

U.S. PATENT DOCUMENTS 3,884,797 A    5/1975 Alley et al.
4,023,227 A    6/1977 Gustafson et al.
(Continued)

FOREIGN PATENT DOCUMENTS

CA    774558    12/1967
FR    2315533    1/1977

OTHER PUBLICATIONS

Cedric Bara, Catalyseurs d'hydrotraltement a base de Mo supporte sur alumine : genese de la phase active et effet de support par une approche science des surfaces, (20150000), URL: https://tel.archives-ouvertes.fr/tel-01617020.
(Continued)

*Primary Examiner* — Randy Boyer
*Assistant Examiner* — Juan C Valencia
(74) *Attorney, Agent, or Firm* — Duane Morris LLP; Gregory M. Lefkowitz; Brandon A. Chan

(57) ABSTRACT

The invention pertains to a process for deep desulphurization of low sulphur content feedstock comprising the steps of providing a low sulphur content hydrocarbon feedstock and contacting said hydrocarbon feedstock with a cobalt-molybdenum desulphurizing system or a nickel-molybdenum desulphurizing system in an oxide form in order to obtain a very low sulphur product comprising less than 5 ppm by weight sulphur.

19 Claims, 1 Drawing Sheet

(51) Int. Cl.
  *B01J 23/00* (2006.01)
  *B01J 23/882* (2006.01)
  *C10G 65/12* (2006.01)

(52) U.S. Cl.
  CPC ..... C10G 65/12 (2013.01); *C10G 2300/1059* (2013.01); *C10G 2300/202* (2013.01); *C10G 2300/301* (2013.01); *C10G 2300/4006* (2013.01); *C10G 2300/4012* (2013.01); *C10G 2300/4018* (2013.01); *C10G 2300/42* (2013.01)

(58) Field of Classification Search
  CPC ...... C10G 2300/301; C10G 2300/4006; C10G 2300/4012; C10G 2300/4018; C10G 2300/42; C10G 2400/02; C10G 2400/04; C10G 2400/18; B01J 21/04; B01J 23/002; B01J 23/882; B01J 23/883; B01J 35/1014; B01J 35/1019; B01J 35/1042; B01J 37/18
  See application file for complete search history.

(56) References Cited

U.S. PATENT DOCUMENTS

| 2003/0106839 | A1* | 6/2003 | Coker | C10G 45/08 208/217 |
| 2006/0260983 | A1* | 11/2006 | Iki | C10G 45/44 208/2 |
| 2013/0001127 | A1 | 1/2013 | Aubry et al. | |
| 2014/0251870 | A1 | 9/2014 | Dufresne. et al. | |
| 2017/0158969 | A1 | 6/2017 | Dath et al. | |
| 2020/0002626 | A1 | 1/2020 | Dupuy et al. | |

OTHER PUBLICATIONS

P. Leprince, Conversion Processes, Institut Frangais du Petrole publications, (19980000), vol. 3.
Xiang Li, Journal of Catalysis, (20070000), vol. 250, pp. 283-293.

* cited by examiner

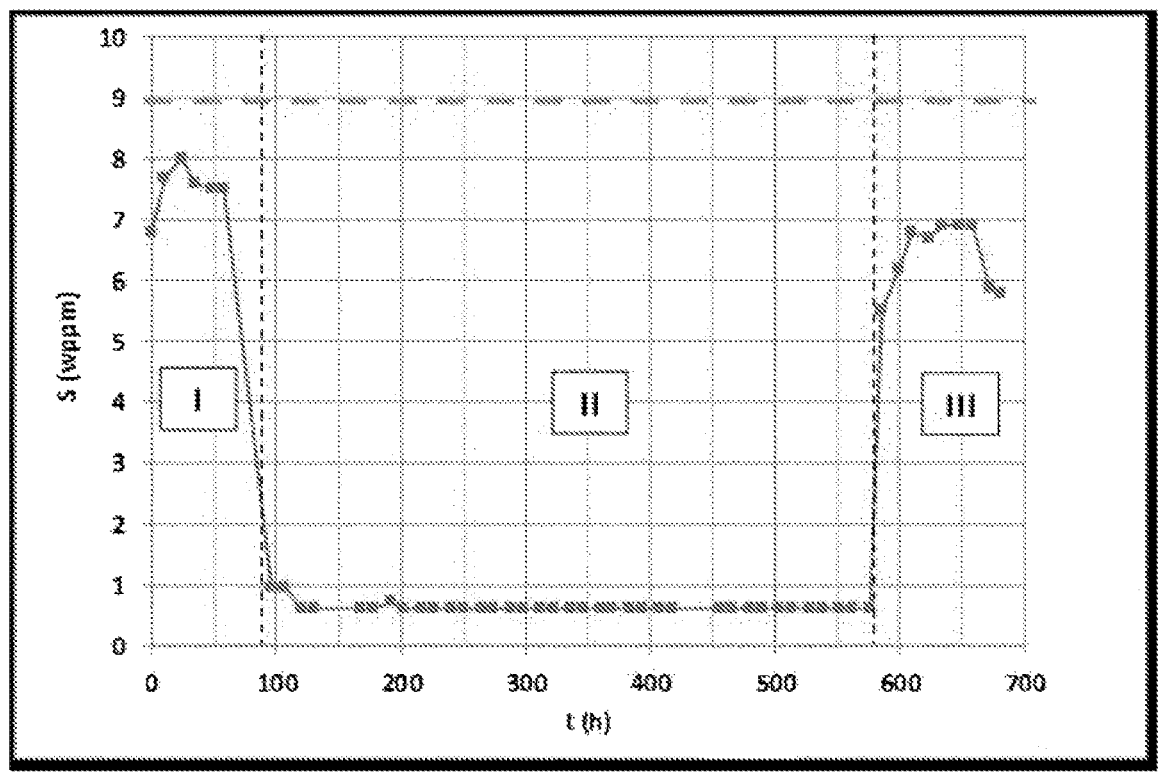

DEEP DESULPHURIZATION OF LOW SULPHUR CONTENT FEEDSTOCK

CROSS-REFERENCE TO RELATED APPLICATIONS

This application is a §371 national stage entry of International Application No. PCT/EP2019/078775, filed Oct. 22, 2019, which claims priority to European Patent Application No. 18306380.9, filed Oct. 22, 2018, the entire contents of which are incorporated herein by reference.

TECHNICAL FIELD

The present invention pertains to a process for deep desulphurization of low sulphur content hydrocarbon feedstock, namely a hydrocarbon feedstock comprising less than 50 ppm of sulphur, in order to obtain a very low sulphur hydrocarbon fluid comprising less than 5 ppm by weight sulphur.

BACKGROUND OF THE INVENTION

Hydrocarbon fluids find widespread use as solvents such as in adhesives, cleaning fluids, explosives solvents for decorative coatings and printing inks, light oils for use in applications such as metalworking or demoulding and industrial lubricants, and drilling fluids. Hydrocarbon fluids may also be used as solvents in a wide variety of other applications such as chemical reactions. The chemical nature and composition of hydrocarbon fluids varies considerably according to the use to which the fluid is to be put. Important properties of hydrocarbon fluids are the distillation range generally determined by ASTM D-86 or the AST D-1160 vacuum distillation technique used for heavier materials, flash point, density, Aniline Point as determined by ASTM D-611, aromatic content, sulphur content, viscosity, and refractive index. Fluids can be classified as paraffinic, isoparaffinic, dearomatised, naphthenic, non-dearomatised and aromatic.

Today, there is a need for hydrocarbon fluids having a very low sulphur content, or even no sulphur. The sulphur content requirement varies with the specific use for which the hydrocarbon fluid is designed.

To produce these hydrocarbon fluids, the preferred feedstocks are specific gasoil cuts, such as low sulphur gasoil cuts. These classical feedstocks exiting the refineries still have a significant sulphur content, for example between 10 and 50 ppm sulphur, and cannot be used directly as hydrocarbon fluids. They need to undergo deep desulphurization in order to meet the sulphur content requirements prescribed in the specific use for which the hydrocarbon fluids are designed.

Additionally, for some applications, it may also be required that the hydrocarbon fluids have a very low aromatics content. Classical feedstocks exiting the refineries may contain more than 20%, or even more than 30% aromatics that must be removed by dearomatization. However, sulphur is a poison for dearomatization catalysts. As a consequence, if the sulphur content of the feedstock is too high, the dearomatization step will be difficult to conduct and the final hydrocarbon fluids will have non-relevant technical specifications both in terms of sulphur and aromatics content.

A variety of catalysts are known in the art for desulphurizing sulphur containing hydrocarbon feedstocks. Among them, catalysts comprising elements from Group VI combined with elements from Group VIII of the Periodic Table are widely used. The Group VI element may be selected from cobalt and nickel and the Group VIII element may be molybdenum. Catalysts usually employed for desulphurization are cobalt-molybdenum catalysts.

In such desulphurization catalysts, Group VI and Group VIII elements are generally dispersed on a carrier such as alumina or silica-alumina. Now, in order to reach a good desulphurization efficiency, the Group VI-Group VIII catalysts generally need to be modified.

Various methods have been proposed to improve the desulphurization efficiency of cobalt-molybdenum catalysts. For example, these catalysts can be modified through the addition of another element such as Nickel or Phosphorous. Document FR2315533 A1 discloses using a cobalt-molybdenum catalysts in an oxidized form supported on alumina for desulphurizing a feedstock with high sulphur content (up to 5 wt %). This document teaches that in order to reach a sulphur content of not more than 0.3 wt %, addition of phosphorous oxide to the cobalt-molybdenum catalyst is necessary.

Document WO2011061716 A2 discloses a process comprising a step of deep hydrodesulphurating of middle distillate. Among others, a nickel/molybdenum or a cobalt/molybdenum catalyst may be used as desulphurization catalyst. The desulphurization is operated under a pressure higher than 80 bar, preferably varying between 80 and 90 bar. As regards cobalt-molybdenum or nickel-molybdenum catalytic systems wherein no additional element is present, it is recognized, as stated in document WO2014135780 A1, that said catalysts can achieve desulphurization only when they are in a sulphurized form. In other words, up to now, it is thought that in order to become active, the Group VI and Group VIII elements which are in an oxidized form in the catalyst need to be reduced to a sulphide form before implementation in a catalytic reaction. As taught by Leprince, it is well-known that a hydrotreating catalyst is manufactured with its Group VI and Group VIII elements in the oxide form and then sulphurized inside the hydrotreatment unit reactor (P. Leprince, 3. *Conversion Processes, Institut Français du Pétrole publications,* 1998, Chap. 16). This was known in 1998 at the time Leprince was published and is still admitted nowadays as confirmed in several PhD Thesis, among which the Thesis of Cedric Bara (*Catalyseurs d'hydrotraitement à base de Mo supporté sur alumine: genèse de la phase active et effet de support par une approche science des surfaces,* 2015, https://tel.archives-ouvertes.fr/tel-01617020). This Thesis still states in 2015 that nickel-molybdenum and cobalt-molybdenum catalysts need to be sulphurized in order to be active.

The sulphurization treatment may be made in situ by adsorbing on the catalyst some of the sulphur present in the sulphur containing molecules of the hydrocarbon feedstock. This step, also named in situ pre-sulphurization, is only possible when the hydrocarbon feedstock comprises a high sulphur content, i.e. more than 1 wt % sulphur.

However, there is a need for a process for deep desulphurization of hydrocarbon feedstocks comprising a low sulphur content (below 50 ppm, i.e. below 0.005 wt %) into hydrocarbon fluids having a very low sulphur content, namely below 5 ppm (0.0005 wt %) without having to carry out a pre-sulphurization step. Indeed a pre-sulphurization step is both costly and time consuming. Now, if the hydrocarbon feedstock comprises less than 50 ppm sulphur (0.005 wt %), it is well considered in the field that this sulphur content is not sufficient to efficiently sulphurize the Group VI and Group VIII elements of the catalyst that are in the oxide form. Besides, deep desulphurization implies removing the very last ppm of sulphur contained in the hydrocarbon feedstock which is very difficult to achieve and for which the catalytic system should be sulphurized. Indeed, the corresponding sulphur containing molecules consist of sterically hindered polycyclic molecules, as detailed in Xiang Li, Journal of Catalysis, 250 (2007) 283-293. The sulphur atom in these molecules is hardly accessible to the catalyst surface.

When in-situ sulphurization is not possible because of the low sulphur content of the feedstock, a commonly used process involves sulphurizing the metal-oxide catalyst before contacting it with feedstock, mainly by contacting the catalyst with sulphur containing molecules which are easily breakable such as dimethyl disulfide (DMDS) or hydrogen sulfide ($H_2S$).

Document U.S. Pat. No. 3,884,797 discloses a process for the hydrodesulfurization of a sulfur-containing hydrocarbon feedstock (naphtha) comprising a first step of hydrofining in a first reactor and a second step of hydrosorption of hydrogen sulfide in a second reactor. In this document, the catalyst is first reduced by heating the catalyst in hydrogen up to a temperature of about 372° C. before implementing the flow of naphtha. Additionally, in the process of this document, the second step aimed at sorbing hydrogen sulfide of the stream. Thus, the hydrocarbon stream introduced into the second reactor comprises substantial amounts of dissolved hydrogen sulfide. Document US 2017/0158969 discloses a process for dearomatization of a petroleum cut. This process aims at saturating the compounds with hydrogen. In this document, the catalyst is dried and then reduced before implementing the process.

It has now been surprisingly found that it is possible to desulphurize a low sulphur containing hydrocarbon feedstock, namely containing less than 50 ppm sulphur, by using a desulphurizing system comprising a Group VI element selected from cobalt and nickel and a Group VII element being molybdenum, both element being in oxide form, without having to pre-sulphurize said desulphurizing system.

SUMMARY OF THE INVENTION

It is an object of the present invention to provide a process for deep desulphurization of low sulphur content hydrocarbon feedstock comprising the steps of:
a) providing a low sulphur content hydrocarbon feedstock comprising less than 50 ppm sulphur, preferably less than 30 ppm sulphur, more preferably less than 20 ppm sulphur and even more preferably less than 10 ppm sulphur,
b) providing a desulphurizing system comprising a Group VI element selected from cobalt and nickel and a Group VIII element being molybdenum, the Group VI and Group VII elements being in oxide form,
c) optionally drying the desulphurizing system by submitting it to a hydrogen flow at a temperature lower than 250° C., preferably lower than 220° C., more preferably ranging from 100° C. to 200° C.,
d) desulfurizing the low sulphur content hydrocarbon feedstock by contacting said hydrocarbon feedstock with the optionally dried desulphurizing system in the presence of hydrogen, at a temperature ranging from 220 to 420° C. and at a pressure of less than or equal to 80 bar, to obtain a desulphurized hydrocarbon fluid comprising less than 5 ppm, preferably less than 3 ppm, more preferably less than 2 ppm sulphur.

Typically, there is no Intermediate step between the drying step c) and the desulphurization step d). Preferably, steps c) and d) are two successive steps. In particular, the desulphurizing system provided in step b) is typically not reduced before contacting it with the hydrocarbon feedstock provided in step a).

It is another object of the invention to propose a process for hydrodearomatization of a low sulphur content hydrocarbon feedstock comprising the steps of:
a) providing a low sulphur content hydrocarbon feedstock comprising less than 50 ppm sulphur, preferably less than 30 ppm sulphur, more preferably less than 20 ppm sulphur and even more preferably less than 10 ppm sulphur,
b) providing a desulphurizing system comprising a Group VI element selected from cobalt and nickel and a Group VIII element being molybdenum, the Group VI and Group VIII elements being in oxide form,
c) optionally drying the desulphurizing system by submitting it to a hydrogen flow at a temperature lower than 250° C., preferably lower than 220° C., more preferably ranging from 100° C. to 200° C.,
d) desulfurizing the low sulphur content hydrocarbon feedstock by contacting said hydrocarbon feedstock with the optionally dried desulphurizing system in the presence of hydrogen, at a temperature ranging from 220 to 420° C. and at a pressure of less than or equal to 80 bar,
e) hydrodearomatizing the obtained hydrocarbon fluid comprising less than 5 ppm, preferably less than 3 ppm, more preferably less than 2 ppm sulphur.

Typically, there is no intermediate step between the drying step c) and the desulphurization step d). Preferably, steps c) and d) are two successive steps. In particular, the desulphurizing system provided in step b) is typically not reduced before contacting it with the hydrocarbon feedstock provided in step a).

Among other advantages that will appear in the description detailed below, the process of the invention enables to extend the time lapse between two successive replacements of the desulphurizing system in a desulphurization reactor as compared to the desulphurizing catalysts of the prior art.

BRIEF DESCRIPTION OF THE FIGURE

FIG. 1 represents a curve illustrating the amount of sulphur in function of reaction conditions and the time on stream, with ( - - ) representing the amount of sulphur in the hydrocarbon feedstock and (—▲—) representing the amount of sulphur in the desulphurized hydrocarbon fluid.

DETAILED DESCRIPTION OF THE INVENTION

According to a first aspect, the process of the Invention comprises deep desulphurization of low sulphur content hydrocarbon feedstock. Appropriate feedstocks are e.g. gasoil, kerosene, Ultra Low Sulphur Diesel, gasoline . . . . Preferred feedstocks for Implementing the process of the invention are hydrocarbon fluids having a boiling range ranging from 60 to 350° C., in particular from 100 to 300° C. According to an embodiment, feedstocks have a boiling point in the range from 100° C. to 400° C., preferably from 150° C. to 350° C. Typically, the Initial boiling point and the final boiling point of the feedstock can be measured according to well-known methods for the skilled person, such as according to the ASTM D-86 standard. According to an embodiment, the low sulphur content hydrocarbon feedstock has a distillation range defined by the difference between the final boiling point and the initial boiling point, not exceeding 80° C., preferably not exceeding 60° C.

The low sulphur content hydrocarbon feedstock comprises less than 50 ppm sulphur, preferably less than 30 ppm sulphur, more preferably less than 20 ppm sulphur and even more preferably less than 10 ppm sulphur, based on the total weight of the low sulphur content hydrocarbon feedstock. According to an embodiment, the low sulphur content hydrocarbon feedstock comprises from 2 to 30 ppm by weight sulphur, from 3 to 20 ppm by weight sulphur or from 3 to 10 ppm by weight sulphur. The sulfur content can be measured according to well-known methods for the skilled person, such as ISO 20846 method.

According to a preferred embodiment, the low sulphur content hydrocarbon feedstock comprises less than 5 ppm by weight of dissolved hydrogen sulphide, preferably less than 3 ppm by weight of dissolved hydrogen sulphide, more preferably less than 1 ppm by weight of dissolved hydrogen sulphide and even more preferably less than 0.5 ppm by weight of dissolved hydrogen sulphide, based on the total weight of the low sulphur content hydrocarbon feedstock. The dissolved hydrogen sulphide content can be measured according to well-known methods for the skilled person, such as by UV fluorescence. The detection limit of this method is typically of 0.5 ppm of dissolved hydrogen sulphide.

In a preferred embodiment, desulphurizing system of the present invention comprises cobalt oxide CoO or nickel oxide NiO and molybdenum trioxide $MoO_3$. According to a preferred embodiment, the Group VI element is cobalt and the weight ratio of Co/(Co+Mo) ranges from 0.1 to 0.5, preferably from 0.2 to 0.4. According to another preferred embodiment, the Group VI element is nickel and the weight ratio of Ni/(Ni+Mo) ranges from 0.1 to 0.5, preferably from 0.2 to 0.4.

In a preferred embodiment, cobalt and molybdenum or nickel and molybdenum are supported on alumina or silica-alumina.

The desulphurizing system is prepared in the conventional manner in the form of, for example, spheres or extrudates. Examples of suitable types of extrudates have been disclosed in the literature (see, int. al., U.S. Pat. No. 4,028,227). Highly suitable for use are cylindrical particles (which may be hollow or not) as well as symmetrical and asymmetrical polylobed particles (2, 3 or 4 lobes). The alumina or silica-alumina support is prepared by extrusion in the form of spheres or extrudates, dried, and further calcined (in the presence or absence of steam) in a temperature range of 475-900° C. The pore volume of the support should generally be in the range of 0.5-2 ml/g, preferably between 0.75-1 mL/g. The specific surface area will generally be in the range of 30-400 $m^2/g$ (measured using the BET method).

According to an embodiment of the invention, the desulphurizing system is prepared by impregnating the alumina or silica-alumina support with an aqueous solution of each metal. For example, the cobalt-molybdenum desuiphurizing system is prepared by impregnating the alumina or silica-alumina support with an aqueous solution of cobalt nitrate and ammonium molybdate. The obtained mixture is washed, dried and calcined according to usual well-known methods.

According to an optional embodiment of the invention, the Group VI/Group VIII desulphurizing system in oxide form is submitted to a hydrogen flow in order to dry the desulphurizing system.

According to a particular embodiment, the desulphurizing system is submitted to a hydrogen flow from 60 to 100 NL/h, preferably of 80 NL/h during 30 minutes to 2 hours, preferably during 1 hour. The temperature for the drying step of the catalyst is lower than 250° C., preferably lower than 220° C., more preferably ranging from 100° C. to 200° C.

Typically, the drying step allows to remove residual water but does not allow to reduce the Group VI and Group VIII elements of the catalyst. Indeed, the drying step is not a reduction step leading to a catalyst wherein the totality of the Group VI and Group VIII elements are in a metallic form. In the process of the invention, the desulphurizing system totally or partially in an oxide form is contacted with the hydrocarbon feedstock. Typically, there is no step of reduction of the desulphurizing system before the contact with the hydrocarbon feedstock.

According to the invention, the deep desulphurization step comprises contacting the hydrocarbon feedstock with the optionally dried desulphurizing system wherein a fraction of the Group VI and Group VIII elements can be in metallic state, typically at least a fraction of the Group VI and Group VIII elements are in an oxide form during the deep desulphurization step. Typically, the deep desulphurization step does not comprise a step of sulphurization of the desulphurizing system before contacting it with the hydrocarbon feedstock.

According to a particular embodiment, the desulphurizing system used in the process of the present invention is not fluorinated before being implemented in said process.

According to a particular embodiment, the process for deep desulphurization comprises contacting the hydrocarbon feedstock with only one desulphurizing system comprising Group VI and Group VIII elements.

According to a particular embodiment, the process for deep desulphurization comprises contacting the hydrocarbon feedstock with only one desulphurizing system comprising cobalt and molybdenum, in other words the process preferably does not comprise contacting the hydrocarbon feedstock with any additional desulphurizing system comprising elements different from cobalt and molybdenum.

According to a particular embodiment, the process for deep desulphurization comprises contacting the hydrocarbon feedstock with only one desuiphurizing system comprising nickel and molybdenum, in other words the process preferably does not comprise contacting the hydrocarbon feedstock with any additional desulphurizing system comprising elements different from nickel and molybdenum.

According to the present invention, the deep desulphurization step is implemented at a pressure of less than or equal to 80 bar, preferably less than or equal to 70 bar, preferably ranging from 20 to 60 bar, more preferably from 30 to 50 bar and preferentially at about 40 bar and at a temperature ranging from 220 to 420° C., preferably from 240 to 400° C., preferably from 250 to 380° C., more preferably from 260 to 360° C., more preferably from 270 to 340° C. even more preferably from 280 to 320° C. and preferentially at about 300*C.

It is quite advantageous to implement the deep desulphurization step at a relatively low pressure below 80 bar since the process can thus be easily Integrated in existing hydrotreating units that work at this (or similar) pressure, without the need of major modification to existing production plants.

In a particular embodiment, the hydrocarbon feedstock is contacted with the optionally dried desulphurizing system with a hydrogen to hydrocarbon ratio $H_2/HC$ ranging from 250 to 350 NL/L of hydrocarbon feedstock, preferably from 270 to 330 NL/L and preferentially of 300 NL/L. According to the invention, the deep desulphurization step is implemented at a Liquid Hourly Space Velocity ranging from 0.1 to 5 $h^{-1}$, preferably from 0.3 to 2 $h^{-1}$, more preferably from 0.5 to 1 $h^{-1}$ and preferentially of 0.7 $h^{-1}$.

According to the invention, the deep desulphurization step may be carried out in one single reactor or in several successive reactors, preferably in two successive reactors.

The low-sulphur hydrocarbon fluid obtained after the deep desulphurization step and comprising less than 5 ppm, preferably less than 3 ppm, more preferably less than 2 ppm by weight sulphur, may be used in applications where a very low sulphur content is required. In particular, such low-sulphur hydrocarbon fluids may be used as fuel base.

The low-sulphur hydrocarbon fluids obtained after the deep desulphurization step may also be used as feedstock for units, e.g. hydrogenation units, running with catalysts that are particularly susceptible to sulphur poisoning. This is for example the case of hydrodearomatization catalysts. According to a second aspect, the process of the invention further comprises a step of hydrodearomatization of the obtained very low sulphur hydrocarbon fluid comprising less than 5 ppm, preferably less than 3 ppm, more preferably less than 2 ppm by weight sulphur. According to one embodiment, the very low sulphur hydrocarbon fluid contains more than 20% aromatics, preferably more than 30%. According to another embodiment, the very low sulphur hydrocarbon fluid contains less than 100% aromatics, preferably less than 70%.

Typically, the obtained dearomatized hydrocarbon fluids comprise less than 100 ppm, preferably less than 50 ppm, and more preferably less than 30 ppm aromatics.

In a preferred embodiment, the hydrodearomatization step is carried out in the presence of a nickel containing catalyst. More preferably the nickel containing catalyst is a supported catalyst. In a preferred embodiment, the hydrodearomatization step comprises two hydrogenation stages. The amount of catalyst in the desulphurization reactor and the two hydrodearomatization reactors, expressed in wt %, can be according to the scheme 0.05-0.5/0.10-0.70/0.25-0.85, for example 0.07.0.25/0.15-0.35/0.4-0.78 and most preferably 0.10-0.20/0.20-0.32/0.48-0.70. In other terms, according to this scheme, the desulphurization reactor comprises from 5 to 50 wt %, the first hydrodearomatization reactor comprises from 10 to 70 wt % and the second hydrodearomatization reactor comprises from 25 to 85 wt % of the total mass of desulphurization catalyst and hydrodearomatization catalyst.

In a preferred embodiment, the hydrodearomatization step further comprises a separation stage, whereby unreacted hydrogen is recovered and a stream of hydrogenated product is recovered. The unreacted hydrogen can be recycled at least in part, to the inlet of the hydrodearomatization process. The stream of hydrogenated product can be recycled at least in part, to the inlet of the hydrodearomatization step. The separation stage can comprise up to three separators staged with decreasing pressure. The pressure in the last separator can be about atmospheric pressure. In one embodiment, the process of the present invention comprises a step of hydrodearomatization of the low-sulphur fluid followed by a step of fractionation. The hydrocarbon fractions obtained by fractionation have defined boiling ranges, e.g. of less than 90° C., the boiling range being defined as the difference between the final boiling point and the initial boiling point.

The fluids obtained by the process of desulphurization and hydrodearomatization, and optionally fractionation, of the invention may be used in drilling fluids, as Industrial solvents, in coating fluids, in explosives, in concrete demoulding formulations, in adhesives, in printing inks, in metal working fluids, as cutting fluids, as rolling oils, as Electrical Discharge Machining fluids, rust preventive in industrial lubricants, as extender oils, in sealants or polymers formulation with silicone, as viscosity depressants in plasticised polyvinyl chloride formulations, in resins, as crop protection fluids, in pharmaceutical products, in paint compositions, in polymers used in water treatment, paper manufacturing or printing pastes and cleaning solvents.

Example

1. Supported CoMo System and Pilot Unit

The test was performed in a pilot unit comprising two reactors, using a commercial supported CoMo system (CoO, $MoO_3$ on $Al_2O_3$) in oxidic form. In each reactor, 56 ml of supported CoMo system were loaded mixed with 50% vol of SIC 0.1 mm. A total of 112 ml of supported CoMo system were loaded in the two reactors.

2. Feed Characterization

A gasoil (GO) with a sulphur content of 8.9 ppmw was used, as represented by the dashed line on FIG. 1. The GO has a dissolved hydrogen sulphide content of less than 0.5 ppm by weight (i.e. the detection limit of the method used), as measured by UV fluorescence.

3. Supported CoMo System Drying

The supported CoMo system was dried in situ by submitting it to a $H_2$ flow (80 NL/h) for 1 hour at 150° C. (with a heating rate of 20° C./h) in order to remove residual water.

4. Testing Conditions

Phase I: Stabilization

The same GO was used as stabilization feed (T=150° C., LHSV=0.7 $h^{-1}$, P=40 bar). After about 60 hours on stream, a stable sulphur content of 7.5 ppmw was reached (see FIG. 1).

Phase II: Test in the Conditions of the Invention

After stabilization, temperature was increased to 350° C. (ramp, 20° C./h). This condition (350° C., LHSV 0.7 $h^{-1}$, P=40 bar) was maintained for 480 hours. A very low sulphur content of about 0.6 ppmw in the hydrocarbon fluid was obtained at the end of Phase II.

Phase III: End of Test

In order to evaluate the desulphurization activity at lower temperature, after 480 hours of test, the temperature was lowered to 200° C. and maintained for about 80 more hours. A sulphur content of about 6.9 ppmw sulphur remained in the liquid effluent.

A summary of the reaction conditions is reported in Table 1 below.

TABLE 1 reaction conditions during Phases I to III

|  | Phase I Stabilization | Phase II Test (According to the invention) | Phase III End of test |
| --- | --- | --- | --- |
| Pressure (barg) | 40 | 40 | 40 |
| LHSV ($h^{-1}$) | 0.7 | 0.7 | 0.7 |
| Feed rate (mL/h) | 78.4 | 78.4 | 78.4 |
| $H_2$/HC (NL/L) | 300 | 300 | 300 |
| Hydrogen flow (NL/h) | 23.5 | 23.5 | 23.5 |
| WABT* (° C.) (REACTOR 1) | 150 | 350 | 200 |
| WABT* (° C.) (REACTOR 2) | 150 | 350 | 200 |
| Duration of condition (h) | 60 | 480 | 80 |

*WABT: Weight Average Bed Temperature

During all the experiment, the mass balance was >99%, calculated according to the following formula:

$$\text{mass balance} = 1 - \left(\frac{\text{IN} - \text{OUT}}{\text{IN}}\right)$$

wherein IN represents the total mass of liquid and gas at the inlet of the reactor and OUT represents the total mass of liquid and gas at the outlet of the reactor.

The invention claimed is:

1. Process for deep desulphurization of low sulphur content hydrocarbon feedstock comprising the steps of:
   a) providing a low sulphur content hydrocarbon feedstock comprising less than 50 ppm by weight sulphur,
   b) providing a desulphurizing system comprising a Group VI element selected from cobalt and nickel and a Group VIII element being molybdenum, the Group VI and Group VIII elements being in oxide form,
   c) optionally drying the desulphurizing system by submitting it to a hydrogen flow at a temperature lower than 250° C.,
   d) desulphurizing the low sulphur content hydrocarbon feedstock by contacting said hydrocarbon feedstock with the optionally dried desulphurizing system in the presence of hydrogen, at a temperature ranging from 220 to 420° C. and at a pressure of less than or equal to 80 bar, to obtain a hydrocarbon fluid comprising less than 5 ppm by weight sulphur, wherein the process further comprises a step of:
   e) hydrodearomatizing the obtained hydrocarbon fluid comprising less than 5 ppm by weight sulphur.

2. The process of claim 1, wherein the Group VI/Group VIII desulphurizing system is a cobalt-molybdenum desulphurizing system in oxide form.

3. The process of claim 2, wherein the cobalt-molybdenum desulphurizing system in oxide form comprises cobalt oxide and molybdenum trioxide.

4. The process of claim 1, wherein the Group VI/Group VIII desulphurizing system is supported on alumina or silica-alumina.

5. The process of claim 1, wherein the hydrogen flow ranges from 60 to 100 NL/h for 30 minutes to 2 hours.

6. The process of claim 1, wherein the pressure is less than or equal to 70 bar.

7. The process of claim 1, wherein the temperature ranges from 240 to 400° C.

8. The process of claim 1, wherein said hydrocarbon feedstock is contacted with the optionally dried desulphurizing system with a hydrogen to hydrocarbon ratio $H_2/HC$ ranging from 250 to 350 NL/L.

9. The process of claim 1, wherein the Liquid Hourly Space Velocity ranges from 0.1 to 5 $h^{-1}$.

10. The process of claim 1, wherein the low sulphur content hydrocarbon feedstock comprises less than 30 ppm by weight sulphur.

11. The process of claim 1, wherein the low sulphur content hydrocarbon feedstock contains less than 5 ppm by weight of dissolved hydrogen sulphide, based on the total weight of the low sulphur content hydrocarbon feedstock.

12. The process of claim 1, wherein the low sulphur content hydrocarbon feedstock has an initial boiling point and a final boiling point between 100° C. and 400° C.

13. The process of claim 1, wherein the low sulphur content hydrocarbon feedstock has a distillation range defined by the difference between the final boiling point and the initial boiling point, not exceeding 80° C.

14. The process of claim 1, wherein the obtained hydrocarbon fluid comprises less than 3 ppm by weight sulphur.

15. The process of claim 5, wherein the hydrogen flow ranges from 60 to 100 NL/h at a temperature ranging from 100° C. to 200° C.

16. The process of claim 1, wherein the Liquid Hourly Space Velocity ranges from 0.3 $h^{-1}$ to 2 $h^{-1}$.

17. The process of claim 1, wherein the Group VI/Group VIII desulphurizing system is a cobalt-molybdenum desulphurizing system in oxide form supported on alumina or silica-alumina.

18. The process of claim 1, wherein said hydrocarbon feedstock is contacted with the optionally dried desulphurizing system with a hydrogen to hydrocarbon ratio $H_2/HC$ ranging from 250 to 350 NL/L and with a Liquid Hourly Space Velocity ranging from 0.3 $h^{-1}$ to 2 $h^{-1}$.

19. The process of claim 1, wherein the contacting temperature ranges from 250 to 380° C.

* * * * *